Oct. 13, 1925.   1,557,432
J. F. DEFORDT
VARIABLE SPEED TRANSMISSION MECHANISM
Original Filed March 21, 1921
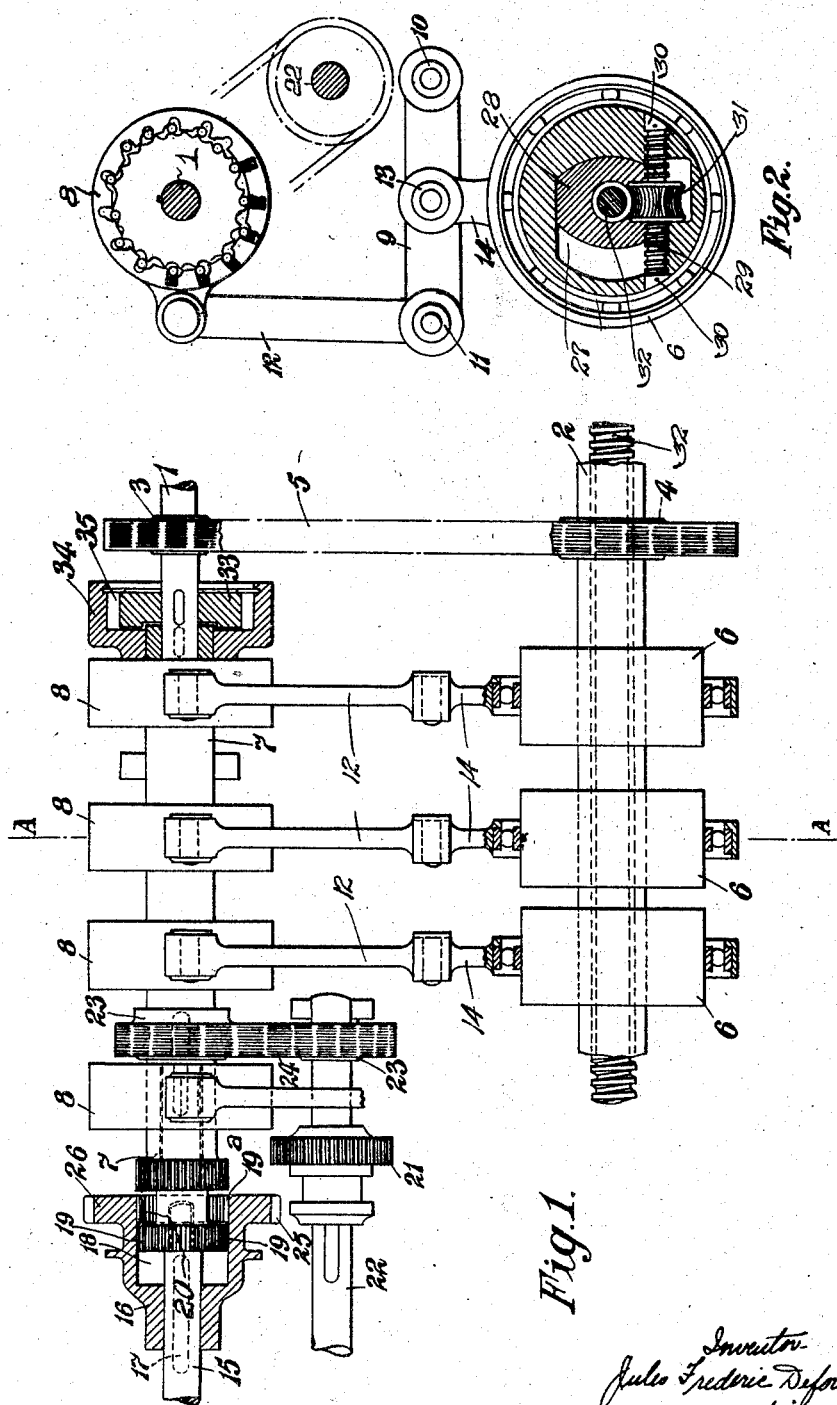

Patented Oct. 13, 1925.

1,557,432

UNITED STATES PATENT OFFICE.

JULES FREDERIC DEFORDT, OF BRUSSELS, BELGIUM.

VARIABLE-SPEED-TRANSMISSION MECHANISM.

Application filed March 21, 1921, Serial No. 454,189. Renewed July 13, 1925.

*To all whom it may concern:*

Be it known that I, JULES FREDERIC DE- FORDT, a subject of the King of Belgium, and resident of Ixelles, Brussels, Belgium, have invented certain new and useful Improvements in Variable-Speed-Transmission Mechanism, of which the following is a specification.

This invention relates to improvements in variable speed transmission mechanism and has for its object to provide a means whereby the power of a shaft driven at constant speed can be transmitted at any desired speed to a driven shaft and further to provide means for reversal of the direction of running and for direct driving from the driving to the driven shaft at will.

The invention consists of a variable speed transmission mechanism comprising a shaft adapted to be driven at constant speed, a secondary shaft adapted to be driven directly from the driving shaft and carrying one or more variable stroke eccentrics, a hollow shaft revolubly mounted upon the driving shaft and adapted to be driven independently of such driving shaft by the one or more variable stroke eccentrics and a corresponding number of free wheel clutches and a driven shaft adapted to be alternately connected directly with either the driving shaft or the said hollow shaft by means of a suitable clutch.

A reversal of direction of rotation of the driven shaft may be provided for by the inclusion in the mechanism of a sliding pinion which is driven in any suitable manner from the hollow shaft and for the purpose of reversal is moved into mesh with a further toothed wheel or member engaging the driven shaft.

Furthermore a free-wheel clutch connection may be provided between the driving shaft and the hollow shaft to prevent the driven shaft from over-running the driving shaft. This free-wheel clutch is so arranged as to permit relative movement between the driving shaft and the hollow shaft in one direction only, that is, in the direction of normal rotation. By this means the driving shaft acts as a brake on the hollow shaft and prevents the speed of such hollow shaft from exceeding the speed of the driving shaft. Such a device is very useful in motor and other self-propelled vehicles as it prevents the vehicle from getting out of control when running down-hill.

In order that the invention may be clearly understood one example of its application will now be described by aid of the accompanying drawings in which:—

Fig. 1 is a diagrammatic general view of the complete mechanism.

Fig. 2 is a side elevation of the same.

The mechanism illustrated in the drawings comprises a driving shaft 1 which is driven at constant speed such for example as by the engine of a self-propelled vehicle or from any other convenient source of power. This shaft 1 drives a secondary shaft 2 at reduced speed through toothed wheels 3 and 4 and a chain 5 or equivalent means. Mounted upon this shaft 2 so as to be driven thereby are a plurality of variable stroke eccentrics 6 which in turn impart rotation to a hollow shaft 7 mounted upon the driving shaft 1 by means of a corresponding number of free wheel clutches 8, the speed of such hollow shaft being thus capable of progressive variation from a minimum to a maximum. The throw of the eccentrics' sheaves may be imparted either directly to the free wheel clutches from the straps by means of single connecting rods or, as preferred by means of the actuating mechanism comprising a rocking arm 9 which is mounted at one end upon a fixed pivot 10, the other end 11 being connected to the outer casing of the respective free wheel clutch by means of a link 12. The throw of the eccentric sheave is imparted to the centre of the rocking arm 9 as at 13 by means of a rigid lug 14 on the eccentric strap.

The driven shaft 15 is alternately connected to the driving shaft 1 and hollow shaft 7 by means of a clutch device of any suitable character one such being illustrated in the drawings and comprising sleeve 16 which is slidably keyed, as at 17, to the inner end of the driven shaft 15 and moved thereon by means of an operating fork or equivalent device of conventional form (not shown). This sleeve 16 is formed with an interior recess 18 to accommodate the inner end of the driving shaft 1 and the corresponding end of the hollow shaft 7 each of which ends are formed with dogs or teeth 19 and 19ª respectively which interengage alternately with corresponding teeth 20 formed within the open end of the recess 18 of the said sleeve 16. In the drawings the clutch is shown in neutral position. When the teeth 20 of the sleeve 16 are engaged with the teeth 19ª on the inner end of the hollow shaft 7 the driven shaft 15 receives its motion from the hollow shaft 7. To obtain direct drive the sleeve 16 is moved towards the left in Fig. 1 so as to bring the teeth 20 into engagement with the teeth 19 on the inner end of the driving shaft 1. In this position the driven shaft 15 is directly connected to the driving shaft 1 whilst the hollow shaft 7 runs free.

The reversing gear shown comprises a toothed pinion 21 which is slidably keyed to a shaft 22. This latter shaft is driven from the hollow shaft 7 by means of pinions 23 and chain 24. To effect reversal of the motion of the driven shaft 15 the sleeve 16 is moved to the neutral position—that is to the position where its teeth 20 are out of engagement with both the teeth 19 and 19ª. The pinion 21 is then moved along its shaft 22 by means of a forked lever, not shown, or other suitable actuating means, until it meshes with corresponding teeth 25 cut around the periphery of a flange 26 on the sleeve 16. The driven shaft 15 thus receives rotational movement, in a reverse direction, from the hollow shaft 7.

Any suitable form of free-wheel clutch may be used but I prefer to employ a free-wheel clutch comprising inner and outer members the latter being rocked over the periphery of the inner member by the aforementioned actuating mechanism. This movement in turn is imparted, in the form of a continuous rotary motion, to the inner member by means of spring controlled laterally disposed rollers which were forced singly into engagement with one of a series of semi-circular recesses in the periphery of the inner member at each operative stroke of the outer member. The recesses in the inner member exceed in number the rollers carried by the outer member by a predetermined amount so that when one roller is in a fully engaged position with a recess the other rollers are in various positions between complete engagement and complete disengagement with corresponding recesses.

The strokes of the eccentrics 6 may be varied in any convenient manner one suitable means for the purpose being illustrated in the drawings and consists in forming each of the eccentric sheaves with an elongated slot 27 each of which slots is adapted to receive the shaped portion 28 of the secondary shaft 2. These slots are so disposed that at one limit of movement of the sheave such sheave resides co-incident with the axis of the shaft 2 so that the periphery of the sheave is concentric with such shaft and consequently no movement is imparted to its strap. Means are however, provided for progressively varying the eccentricity of each of the sheaves such means comprising a screw 29 which is pinned at each end as at 30 to the eccentric sheave. This screw is engaged by a nut 31 having worm wheel teeth cut around its periphery with which engages a worm shaft 32.

This worm shaft extends through the center of the shaft 2 and is independently rotatable by suitable means not shown.

To vary the eccentricity of the eccentric sheaves the worm shaft 32 is rotated. This causes the nuts 31 to rotate and to consequently impart an axial movement to their screws 29 thus moving the eccentric sheaves laterally on the shaped portions of the shaft 2. By this means the throw of the eccentric sheaves may be gradually varied from a minimum to a maximum with a consequent gradual variation in the speed of the hollow shaft 7.

When using the above described transmission gear under circumstances where there is a possibility of the driven shaft 15 overrunning the driving shaft 1 such for example as in self-propelled vehicles, it is preferred to employ means for preventing such overrunning. One such means is illustrated in Fig. 1 of the drawings and consists of a free wheel clutch device comprising two elements 33 and 34 adapted to operatively engage each other when relatively rotated in one direction and to run independently of each other when relatively rotated in the opposite direction. In applying this clutch to the mechanism according to this invention the element 33 is keyed upon the shaft 1 so as to rotate therewith and the element 34 is similarly keyed to the adjacent end of the hollow shaft 7. The means of operatively connecting these two elements together may consist of pawls and ratchet teeth or equivalent means 35 the only essential being that the shaft 1 is allowed to run free when its speed exceeds that of the shaft 7 but that when the speed of the shaft 7 commences to overrun the shaft 1 such pawls and ratchets or other means will engage with each other thus utilizing the shaft 1 as a brake for the shaft 7.

What I claim and desire to secure by Letters Patent is:—

1. A variable speed gear comprising a shaft to be driven at constant speed, a secondary shaft, means constituting a direct driving connection between said constant speed shaft and said secondary shaft, variable stroke eccentrics mounted upon and driven by said secondary shaft, means for varying the eccentricity of said eccentrics from zero to a maximum, a hollow shaft mounted concentrically upon said constant speed shaft and revoluble independently thereof, free wheel clutches mounted upon and driving said hollow shaft, means constituting a driving connection between said variable stroke eccentrics and said free wheel clutches and adapted to increase the throw of said eccentrics, a driven shaft, means for connecting said driven shaft alternatively with said constant speed shaft and said hollow shaft, and means for reversing the direction of rotation of said driven shaft.

2. A variable speed gear comprising a shaft to be driven at constant speed, a secondary shaft, means constituting a direct driving connection between said secondary shaft and said constant speed shaft, variable stroke eccentrics mounted upon and driven by said secondary shaft, a hollow shaft mounted concentrically upon said constant speed shaft and revolvable independently thereof, means connecting said hollow shaft to said constant speed shaft so as to prevent the speed of said hollow shaft from exceeding the speed of the constant speed shaft, free wheel clutches mounted upon and driving said hollow shaft, means constituting a driving connection between said variable stroke eccentrics and said free wheel clutches and adapted to increase the throw of said eccentrics, a driven shaft and means for connecting said driven shaft alternatively with said constant speed shaft and said hollow shaft.

3. A variable speed gear comprising a shaft to be driven at constant speed, a secondary shaft, means constituting a direct driving connection between said constant speed shaft and said secondary shaft, variable stroke eccentrics mounted upon and driven by said secondary shaft, means for varying the eccentricity of said eccentrics from zero to a maximum, a hollow shaft mounted concentrically upon said constant speed shaft and revoluble independently thereof, means connecting said hollow shaft to said constant speed shaft so as to prevent the speed of said hollow shaft from exceeding the speed of the constant speed shaft, free wheel clutches mounted upon and driving said hollow shaft, means constituting a driving connection between said variable stroke eccentrics and said free wheel clutches and adapted to increase the throw of said eccentrics, a driven shaft and means for connecting said driven shaft alternatively with said constant speed shaft and said hollow shaft.

4. A variable speed gear comprising a shaft to be driven at constant speed, a secondary shaft, means constituting a direct driving connection between said constant speed shaft and said secondary shaft, variable stroke eccentrics mounted upon and driven by said secondary shaft, means for varying the eccentricity of said eccentrics from zero to a maximum, a hollow shaft mounted concentrically upon said constant speed shaft and revoluble independently thereof, means connecting said hollow shaft to said constant speed shaft so as to prevent the speed of said hollow shaft from exceeding the speed of the constant speed shaft, free wheel clutches mounted upon and driving said hollow shaft, means constituting a driving connection between said variable stroke eccentrics and said free wheel clutches and adapted to increase the throw of said eccentrics, a driven shaft and means for connecting said driven shaft alternatively with said constant speed shaft and said hollow shaft, means for reversing the direction of rotation of said driven shaft.

In witness whereof I affix my signature.

JULES FREDERIC DEFORDT.